(12) United States Patent
Khan et al.

(10) Patent No.: US 12,352,574 B2
(45) Date of Patent: Jul. 8, 2025

(54) MULTI-AXIS FIBER OPTIC GYROSCOPE PHOTONIC INTEGRATED CIRCUIT FOR INERTIAL MEASUREMENT UNITS AND INERTIAL NAVIGATION SYSTEMS

(71) Applicant: EMCORE Corporation, Alhambra, CA (US)

(72) Inventors: Jan Amir Khan, Windsor, CT (US); Martin A. Kits van Heyningen, Newport, RI (US)

(73) Assignee: EMCORE CORPORATION, Alhambra, CA (US)

( * ) Notice: Subject to any disclaimer, the term of this patent is extended or adjusted under 35 U.S.C. 154(b) by 295 days.

(21) Appl. No.: 18/059,653

(22) Filed: Nov. 29, 2022

(65) Prior Publication Data
US 2023/0168090 A1 Jun. 1, 2023

Related U.S. Application Data (60) Provisional application No. 63/264,671, filed on Nov. 30, 2021.

(51) Int. Cl.
*G01C 19/72* (2006.01)

(52) U.S. Cl.
CPC .......... *G01C 19/725* (2013.01); *G01C 19/728* (2013.01)

(58) Field of Classification Search
CPC ................... G01C 19/725; G01C 19/728
See application file for complete search history.

(56) References Cited

U.S. PATENT DOCUMENTS

| | | | |
|---|---|---|---|
| 4,420,259 A | 12/1983 | Taylor |
| 4,678,267 A | 7/1987 | Burns et al. |
| 4,842,358 A | 6/1989 | Hall |
| 4,890,922 A | 1/1990 | Wilson |
| 4,915,503 A | 4/1990 | Pavlath |
| 4,938,594 A | 7/1990 | Pavlath |

(Continued)

FOREIGN PATENT DOCUMENTS

| | | |
|---|---|---|
| CN | 205720760 U | 11/2016 |
| CN | 107843957 A | 3/2018 |

(Continued)

OTHER PUBLICATIONS

Machine Translation of CN-112833873-A (Year: 2021).*

(Continued)

*Primary Examiner* — Nguyen Q. Ha
(74) *Attorney, Agent, or Firm* — Hamilton, Brook, Smith & Reynolds, P.C.

(57) ABSTRACT

A photonic integrated circuit (PIC) comprises at least two optical circuits disposed on the PIC, two or more optical interfaces each configured to provide a connection to at least one external optical component, and a layout arrangement of the at least two optical circuits on the PIC, the layout arrangement configured such that the two or more optical interfaces are situated in at least one local group of optical interfaces, and the at least one local group of optical interfaces is located on at least one facet of the PIC. The at least two optical circuits may comprise a set of N single-axis 2×2 optical fiber optic gyroscope (FOG) circuits for use as a multi-axis FOG assembly in an inertial management unit (IMU) or an inertial navigation system (INS).

20 Claims, 8 Drawing Sheets

(56) References Cited

U.S. PATENT DOCUMENTS

| | | | |
|---|---|---|---|
| 4,969,742 A | 11/1990 | Falk et al. | |
| 5,037,205 A | 8/1991 | Pavlath | |
| 5,194,917 A | 3/1993 | Regener | |
| 5,223,911 A | 6/1993 | Suchoski et al. | |
| 5,321,503 A | 6/1994 | Bramson | |
| 5,363,457 A | 11/1994 | Falt et al. | |
| 5,365,338 A | 11/1994 | Bramson | |
| 5,393,371 A | 2/1995 | Chang et al. | |
| 5,436,992 A | 7/1995 | Wang et al. | |
| 5,475,771 A | 12/1995 | Hosoi | |
| 5,537,671 A | 7/1996 | Toyama et al. | |
| 5,579,424 A | 11/1996 | Schneider | |
| 5,600,745 A | 2/1997 | Wuu et al. | |
| 5,627,644 A | 5/1997 | Sanders | |
| 5,729,641 A | 3/1998 | Chandonnet et al. | |
| 5,838,844 A | 11/1998 | Van et al. | |
| 5,909,305 A | 6/1999 | Kinoshita | |
| 5,946,434 A | 8/1999 | Lee | |
| 5,982,961 A | 11/1999 | Pan et al. | |
| 6,108,086 A | 8/2000 | Michal et al. | |
| 6,140,009 A | 10/2000 | Wolk et al. | |
| 6,163,632 A | 12/2000 | Rickman et al. | |
| 6,293,688 B1 | 9/2001 | Deacon | |
| 6,298,178 B1 | 10/2001 | Day et al. | |
| 6,360,038 B1 | 3/2002 | Grubsky et al. | |
| 6,445,455 B1 | 9/2002 | Hall et al. | |
| 6,490,045 B1 | 12/2002 | Dakin et al. | |
| 6,584,240 B2 | 6/2003 | Doi et al. | |
| 6,680,472 B1 | 1/2004 | Thingboe et al. | |
| 6,760,520 B1 | 7/2004 | Medin et al. | |
| 6,778,751 B2 | 8/2004 | Tada et al. | |
| 6,905,904 B2 | 6/2005 | Gardner et al. | |
| 6,920,257 B1 | 7/2005 | Mekis et al. | |
| 7,061,610 B2 | 6/2006 | Mittelstein et al. | |
| 7,085,441 B1 | 8/2006 | Kozlov | |
| 7,218,809 B2 | 5/2007 | Zhou et al. | |
| 7,224,878 B1 | 5/2007 | Wessels et al. | |
| 7,426,326 B2 | 9/2008 | Moeller et al. | |
| 7,711,214 B2 | 5/2010 | Tsuzuki et al. | |
| 7,783,146 B2 | 8/2010 | Blauvelt et al. | |
| 7,899,286 B2 | 3/2011 | Yoshida | |
| 8,121,874 B1 | 2/2012 | Guheen et al. | |
| 9,411,098 B2 | 8/2016 | Onaka | |
| 9,664,931 B1 | 5/2017 | Yap et al. | |
| 9,690,045 B2 | 6/2017 | Goodwill et al. | |
| 9,739,938 B2 | 8/2017 | Shi et al. | |
| 9,746,612 B2 | 8/2017 | Lipson et al. | |
| 9,952,456 B2 | 4/2018 | Huang | |
| 10,018,789 B2 | 7/2018 | Wang et al. | |
| 10,041,797 B2 * | 8/2018 | Jain | G01C 19/721 |
| 10,108,789 B2 | 10/2018 | Lehmann et al. | |
| 10,274,319 B2 | 4/2019 | Wang | |
| 10,488,596 B2 | 11/2019 | Akiyama | |
| 10,545,288 B2 | 1/2020 | Ma et al. | |
| 10,921,682 B1 | 2/2021 | Wang | |
| 11,092,748 B2 | 8/2021 | Wang et al. | |
| 11,313,682 B1 * | 4/2022 | Hung | G01C 19/725 |
| 11,320,267 B2 | 5/2022 | Wang | |
| 11,353,655 B2 | 6/2022 | Wang et al. | |
| 11,415,419 B2 | 8/2022 | Wang et al. | |
| 12,136,681 B2 | 11/2024 | Wang et al. | |
| 2002/0003918 A1 | 1/2002 | Ooi et al. | |
| 2002/0024786 A1 | 2/2002 | Shearon et al. | |
| 2002/0149780 A1 | 10/2002 | Trinh | |
| 2002/0197037 A1 | 12/2002 | Bailey et al. | |
| 2003/0081092 A1 | 5/2003 | Ishizuka et al. | |
| 2003/0081902 A1 | 5/2003 | Blauvelt et al. | |
| 2004/0057667 A1 | 3/2004 | Yamada et al. | |
| 2004/0168234 P1 | 8/2004 | Fischer | |
| 2004/0223695 A1 | 11/2004 | Kersten et al. | |
| 2005/0021348 A1 | 1/2005 | Chan et al. | |
| 2005/0025427 A1 | 2/2005 | Dougherty et al. | |
| 2006/0133754 A1 | 6/2006 | Patel et al. | |
| 2006/0251849 A1 | 11/2006 | Blauvelt et al. | |
| 2007/0053625 A1 | 3/2007 | Ichioka et al. | |
| 2007/0229838 A1 | 10/2007 | Greening et al. | |
| 2008/0024786 A1 | 1/2008 | Sanders | |
| 2008/0166095 A1 | 7/2008 | Popovic et al. | |
| 2008/0291459 A1 | 11/2008 | Meyer et al. | |
| 2009/0087144 A1 | 4/2009 | Yoshida | |
| 2009/0190876 A1 | 7/2009 | Doi | |
| 2010/0137849 A1 | 6/2010 | Hanft et al. | |
| 2010/0245834 A1 | 9/2010 | Strandjord | |
| 2011/0064355 A1 | 3/2011 | Soma et al. | |
| 2012/0217419 A1 | 8/2012 | Riesen et al. | |
| 2013/0202250 A1 | 8/2013 | Guattari et al. | |
| 2013/0308897 A1 | 11/2013 | Sercel et al. | |
| 2014/0075357 A1 | 3/2014 | Flores et al. | |
| 2014/0185979 A1 | 7/2014 | Evans et al. | |
| 2014/0376001 A1 | 12/2014 | Swanson | |
| 2014/0376083 A1 | 12/2014 | Onaka | |
| 2015/0021291 A1 | 1/2015 | Shastri et al. | |
| 2015/0027042 A1 | 1/2015 | Goodwin et al. | |
| 2015/0205181 A1 | 7/2015 | Kondou | |
| 2015/0212271 A1 | 7/2015 | Chen | |
| 2015/0277042 A1 | 10/2015 | Goodwill et al. | |
| 2015/0277156 A1 | 10/2015 | Kondou | |
| 2016/0357085 A1 | 12/2016 | Jewart et al. | |
| 2017/0131472 A1 | 5/2017 | Kobyakov et al. | |
| 2017/0168234 A1 | 6/2017 | Shi et al. | |
| 2017/0192171 A1 | 7/2017 | Shi et al. | |
| 2017/0205578 A1 | 7/2017 | Van et al. | |
| 2017/0205583 A1 | 7/2017 | Bennett et al. | |
| 2017/0329082 A1 | 11/2017 | Ma et al. | |
| 2018/0120504 A1 | 5/2018 | Qi et al. | |
| 2018/0259337 A1 | 9/2018 | Wang | |
| 2018/0274926 A1 | 9/2018 | Wang | |
| 2019/0086614 A1 | 3/2019 | Wang et al. | |
| 2019/0384076 A1 | 12/2019 | Feke | |
| 2020/0116489 A1 | 4/2020 | Wang et al. | |
| 2020/0135960 A1 | 4/2020 | Wang et al. | |
| 2020/0371286 A1 | 11/2020 | Wang et al. | |
| 2021/0048721 A1 | 2/2021 | Wang | |
| 2021/0240050 A1 | 8/2021 | Khan | |
| 2023/0049259 A1 | 2/2023 | Khan et al. | |

FOREIGN PATENT DOCUMENTS

| | | | | |
|---|---|---|---|---|
| CN | 112833873 A | * | 5/2021 | ........... G01C 19/721 |
| EP | 0279603 A2 | | 8/1988 | |
| EP | 0883000 A1 | | 12/1998 | |
| EP | 0893671 A2 | | 1/1999 | |
| EP | 1396741 A1 | | 3/2004 | |
| EP | 2096408 A2 | | 9/2009 | |
| EP | 2246663 A2 | | 11/2010 | |
| EP | 3454101 A1 | | 3/2019 | |
| GB | 2201256 A | | 8/1988 | |
| JP | 63-070114 A | | 3/1988 | |
| JP | 02-275402 A | | 11/1990 | |
| JP | 02-504080 A | | 11/1990 | |
| JP | 05-224045 A | | 9/1993 | |
| JP | 07-022674 A | | 1/1995 | |
| JP | 08-226822 A | | 9/1996 | |
| JP | 09-159865 A | | 6/1997 | |
| JP | 09-159869 A | | 6/1997 | |
| JP | 2006-276518 A | | 10/2006 | |
| JP | 2007-025583 A | | 2/2007 | |
| JP | 2007-272121 A | | 10/2007 | |
| JP | 2009-103792 A | | 5/2009 | |
| JP | 2012-078508 A | | 4/2012 | |
| JP | 2012-215901 A | | 11/2012 | |
| JP | 2013-255086 A | | 12/2013 | |
| JP | 2017-518524 A | | 7/2017 | |
| KR | 10-1990-0008876 B1 | | 12/1990 | |
| KR | 10-1999-0014060 A | | 2/1999 | |
| WO | 89/01534 A1 | | 2/1989 | |
| WO | 89/02060 A1 | | 3/1989 | |
| WO | 89/10534 A1 | | 11/1989 | |
| WO | 8912082 | | 12/1989 | |
| WO | 99/15856 A1 | | 4/1999 | |
| WO | 2015/008451 A1 | | 1/2015 | |
| WO | 2015/108488 A1 | | 7/2015 | |
| WO | 2016/010528 A1 | | 1/2016 | |
| WO | 2018/165238 A1 | | 9/2018 | |

(56) References Cited

FOREIGN PATENT DOCUMENTS

| WO | 2018/175524 A1 | 9/2018 |
|---|---|---|
| WO | 2019/055663 A1 | 3/2019 |
| WO | 2020/077216 A1 | 4/2020 |
| WO | 2020/092789 A1 | 5/2020 |
| WO | 2020/236569 A1 | 11/2020 |
| WO | 2021/034560 A1 | 2/2021 |
| WO | 2021/154970 A1 | 8/2021 |
| WO | 2023/211518 A2 | 11/2023 |

OTHER PUBLICATIONS

Bauters, et al., "Ultralow-Loss Planar Si3N4 Waveguide Polarizers," IEEE Photonics Journal, 5(1), Article S/N: 6600207 (2013).
Cheng, Z. J., et al., "Polymer-waveguide-based vertical coupler", Optics Communications, vol. 260, No. 2, Apr. 15, 2006.
Florjanczyk, M., et al, "Tiny spectrometer enables cost-effective space-borne sensing" SPIE Newsroom, 10.1117/2.1200912.002524, 2009.
Garanovich, I., et al., "Nonlinear directional coupler for polychromatic light", Optics Letters vol. 32, Issue 5, pp. 475-477 (2007).
Glen A et al., "Improvements to Signal Processing and Component Minaturization of Compact Resonator Fiber Optics Gyroscopes", 2018 DGON Inertial Sensors and Systems (ISS). IEEE, Sep. 11, 2018 (Sep. 11, 2018), pp. 1-22, XP033475163,.
Hammer, M., et al., "Hybrid coupled-mode modeling in 3D: perturbed and coupled channels, and waveguide crossings", Journal of Optical Society of America, vol. 34, No. 3, Mar. 1, 2017.
Hatta, A.M., et al. "Design of the optical core of an integrated ratiometric wavelength monitor" Proceedings 14th European Conference on Integrated Optics: ECIO 08 Eindhoven: Jun. 11-13, 2008, Eindhoven University of Technology, The Netherlands, paper, ThP25.
Hatta, A.M., et al., "A simple integrated ratiometric wavelength monitor based on a directional coupler", Optik 125 (2014) 795-798.
Hochber, M., et al., "Silicon photonics: the next fabless semiconductor industry", IEEE Solid-State Circuits Magazine, IEEE, USA, vol. 5, No. 1, Mar. 1, 2013.
Humaira et al., "Integrated silicon photonic TE-pass polarizer", 2016 Photonics North (PN), IEEE, May 24, 2016 (May 24, 2016), p. 1, XP032939515.
International Preliminary Report on Patentability received for PCT Patent Application No. PCT/US2018/021262, mailed on Feb. 28, 2019, 35 pages.
International Preliminary Report on Patentability received for PCT Patent Application No. PCT/US2018/023472, mailed on Oct. 3, 2019, 9 pages.
International Preliminary Report on Patentability received for PCT Patent Application No. PCT/US2018/050896, mailed on Mar. 26, 2020, 11 pages.
International Preliminary Report on Patentability received for PCT Patent Application No. PCT/US2019/055849, mailed on Apr. 22, 2021, 11 pages.
International Preliminary Report on Patentability received for PCT Patent Application No. PCT/US2019/059195, mailed on May 14, 2021, 9 pages.
International Preliminary Report on Patentability received for PCT Patent Application No. PCT/US2020/033092, mailed on Dec. 2, 2021, 10 pages.
International Preliminary Report on Patentability received for PCT Patent Application No. PCT/US2020/045877, mailed on Mar. 3, 2022, 8 pages.
International Preliminary Report on Patentability received for PCT Patent Application No. PCT/US2021/015454, mailed on Aug. 11, 2022, 11 pages.
International Search Report and Written Opinion received for PCT Patent Application No. PCT/US2018/021262, mailed on Jun. 15, 2018, 16 pages.
International Search Report and Written Opinion received for PCT Patent Application No. PCT/US2018/023472, mailed on Jun. 29, 2018, 11 pages.
International Search Report and Written Opinion received for PCT Patent Application No. PCT/US2018/050896, mailed on Jan. 7, 2019, 14 pages.
International Search Report and Written Opinion received for PCT Patent Application No. PCT/US2019/055849, mailed on Mar. 11, 2020, 14 pages.
International Search Report and Written Opinion received for PCT Patent Application No. PCT/US2019/059195, mailed on Jan. 16, 2020, 11 pages.
International Search Report and Written Opinion received for PCT Patent Application No. PCT/US2020/033092, mailed on Sep. 4, 2020, 12 pages.
International Search Report and Written Opinion received for PCT Patent Application No. PCT/US2020/045877, mailed on Nov. 9, 2020, 10 pages.
International Search Report and Written Opinion received for PCT Patent Application No. PCT/US2021/015454, mailed on Jun. 15, 2021, 13 pages.
Lallier, E., et al., "Laser Oscillation of Single-Mode Channel Waveguide in ND:MGO:LINB03", Electronic Letters, IEEE Stevenage, GB, vol. 26, No. 22, Oct. 26, 1989.
Leijtens, X., et al., "Arrayed Waveguide Gratings", in "Wavelength Fillers in Fibre Optics", vol. 123 of the series Springer Series in Optical Sciences pp. 125-187 (date uknown).
Lu, M. et al., "Field Patterns of the TE Modes in Ridge-Trough Waveguide", International Journal of Infrared and Millimeter Waves, Kluwer Academic Publishers—Plenum Publishers, NE, vol. 23, No. 8, Aug. 1, 2002.
Muneeb, M., et al., "Silicon-on-insulator shortwave infrared wavelength meter with integrated photodiodes for on-chip aser monitoring", Nov. 3, 2014 | vol. 22, No. 221 DOI:10.1364/OE.22.027300 I Optics Express 27300.
Park, H., et al. "Device and Integratino Technology for Silicon Photonic Transmitters", IEEE Journal of Selectred Topics in Quantum Electronics, vol. 17, No. 3, May/Jun. 2011.
Pu, M et al., "Ultra-low-loss inverted taper coupler for silicon-on-insulator ridge waveguide", Optics Communications, Elsevier, Amsterdam, NL, vol. 283, No. 19, Oct. 1, 2010.
Ren, T., et al., "An Integrated Low-Voltage Broadband Lithium Niobate Phase Modulator", IEEE Photonics Technology Letters, vol. 31, No. 11, Jun. 1, 2019.
Sanders, G., et al., "Improvements to Signal Processing and Component Minaturization of Compact Resonator Fiber Optic Gyroscopes", 2018 DGON Inertial Sensors and Systems (ISS), IEEE, Sep. 11, 2018.
Seyringer, D., et al., "Arrayed Waveguide Gratings", SPIE Press Book, Dale Published: Jun. 3, 2016, ISBN: 9781510603608, vol. SL16.
Shang. K., et al., "Low-loss compact multilayer silicon nitride platform for 3D pholonic integrated circuits" Optics Express, vol. 23, No. 16, Aug. 6, 2015.
Srinivasan, S., et al., "Design of integrated hybrid silicon waveguide optical gyroscope", Optics Express 24988, vol. 22, No. 21, Oct. 20, 2014.
Steier W H et al., "Polymer Electro-Optic Devices for Integrated Optics", Chemical Physics, Amsterdam, NL, vol. 245, No. 1-03, Jul. 1, 1999 (Jul. 1, 1999), pp. 487-506, XP001088327.
Tan, Y. et al., "Polarization-selective microring resonators", Optics Express, vol. 25, No. 4, Feb. 15, 2017 (Feb. 15, 2017).
Tianhao et al., "An Integrated Low-Voltage Broadband Lithium Niobate Phase Modulator", IEEE Photon I CS Technology Letters, IEEE Service Center, vol. 31, No. 11, Jun. 1, 2019 (Jun. 1, 2019), pp. 889-892, XP011724758,.
Tran, M., et al., "Integrated optical driver for interferometric optical gyroscopes", Optics Express 3827, vol. 25, No. 4, Feb. 20, 2017.
Wang, P., et al. "A Ratiometric Wavelength Measurement Based on a Silicon-on-Insulator Directional Coupler Integrated Device", Sensors 2015, 15 21281.

(56) References Cited

OTHER PUBLICATIONS

Wang, P., et al., "Passive photonic integrated ratiometric wavelength monitor with resolution better than 15 pm", vol. 25, No. 3 | Feb. 6, 2017 | Optics Express 2940.

Yu, C., et al., "Stable and Compact Optical Module for Fiber-Optic Gyroscope Application", Fiber and Integrated Optics, 33:306-314, 2014.

Jiang, Zhiguo et al. "Suppression of residual intensity modulation induced error in resonator fiber optic gyroscopes with improved modulation technique". Optics Communications, vol. 459, Mar. 15, 2020. (Year: 2020).

Ying, Diqing et al. "An open-loop RFOG based on harmonic division technique to suppress LD's intensity modulation noise". Optics Communications, vol. 378, Nov. 1, 2016, pp. 10-15. (Year: 2016).

Zhang, Chengfei et al. "Suppression of residual intensity modulation noise in resonator integrated optic gyro". Optics Communications, vol. 430, Jan. 1, 2019, pp. 358-363. (Year: 2019).

International Search Report and Written Opinion received for PCT Patent Application No. PCT/US2022/080549, mailed on Dec. 13, 2023, 14 pages.

\* cited by examiner

MULTI-AXIS FIBER OPTIC GYROSCOPE PHOTONIC INTEGRATED CIRCUIT FOR INERTIAL MEASUREMENT UNITS AND INERTIAL NAVIGATION SYSTEMS

RELATED APPLICATION(S)

This application claims the benefit of U.S. Provisional Application No. 63/264,671, filed on Nov. 30, 2021. The entire teachings of the above application(s) are incorporated herein by reference.

BACKGROUND

Inertial Measurement Unit (IMU) packages utilize multiple fiber optic gyroscopes (FOGs), multi-access accelerometers and other sensor aids to provide an inertial reference solution. The use of multiple fiber optic gyroscopes, to measure angular rate with respect to each of multiple axes, is conventionally accomplished with three individual optical circuits.

Figure 1:
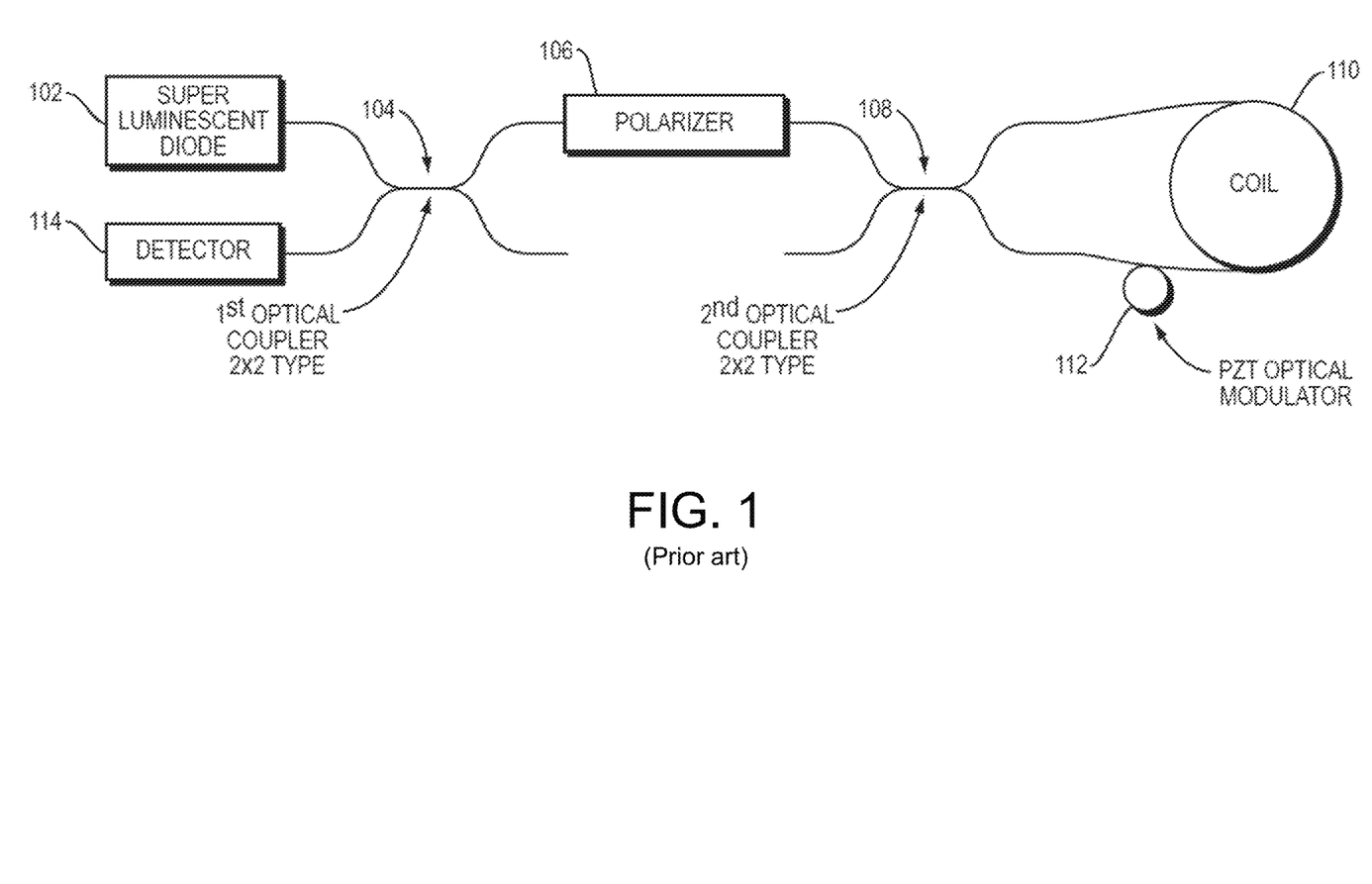
FIG. 1 illustrates an example of an individual single-axis 2×2 optical FOG circuit.

Each of the individual optical circuits consists of discrete components such as a light source, optical couplers, optical detectors, optical polarizers, and optical fiber coils. FIG. 1 illustrates an example of an individual single-axis 2×2 optical FOG circuit, which comprises a super luminescent diode (SLD) 102, a first 2×2 (i.e., two inputs, two outputs) optical coupler 104, a polarizer 106, a second optical coupler 108, a fiber coil 110, a PZT optical modulator 112, and a photodetector 114. The "2×2" designation for the "2×2 optical FOG circuit" refers to the fact that the optical circuit shown in FIG. 1 is constructed with two individual 50:50 optical splitters. The first splitter has two ports at one end (corresponding to the SLD 102 and the detector 114), and the second splitter has two ports at the other end (corresponding to the two ports of the fiber coil 110).

Although the example optical circuit shown in FIG. 1 uses an SLD as a light source, other light sources may be used, such as a light emitting diode (LED), a super-fluorescence fiber source (SFS), an amplified spontaneous emission (ASE) source, a laser, or other such emitters or combinations thereof.

The optical couplers 104, 108 typically comprise either single mode or polarization maintaining optical fibers that are fused and/or constructed to provide light splitting capabilities. Conventionally 50:50 couplers are utilized, although other split ratios may be utilized. The polarizer 106 is generally fabricated using optical fiber or with pigtailed discrete crystals.

Figure 2:
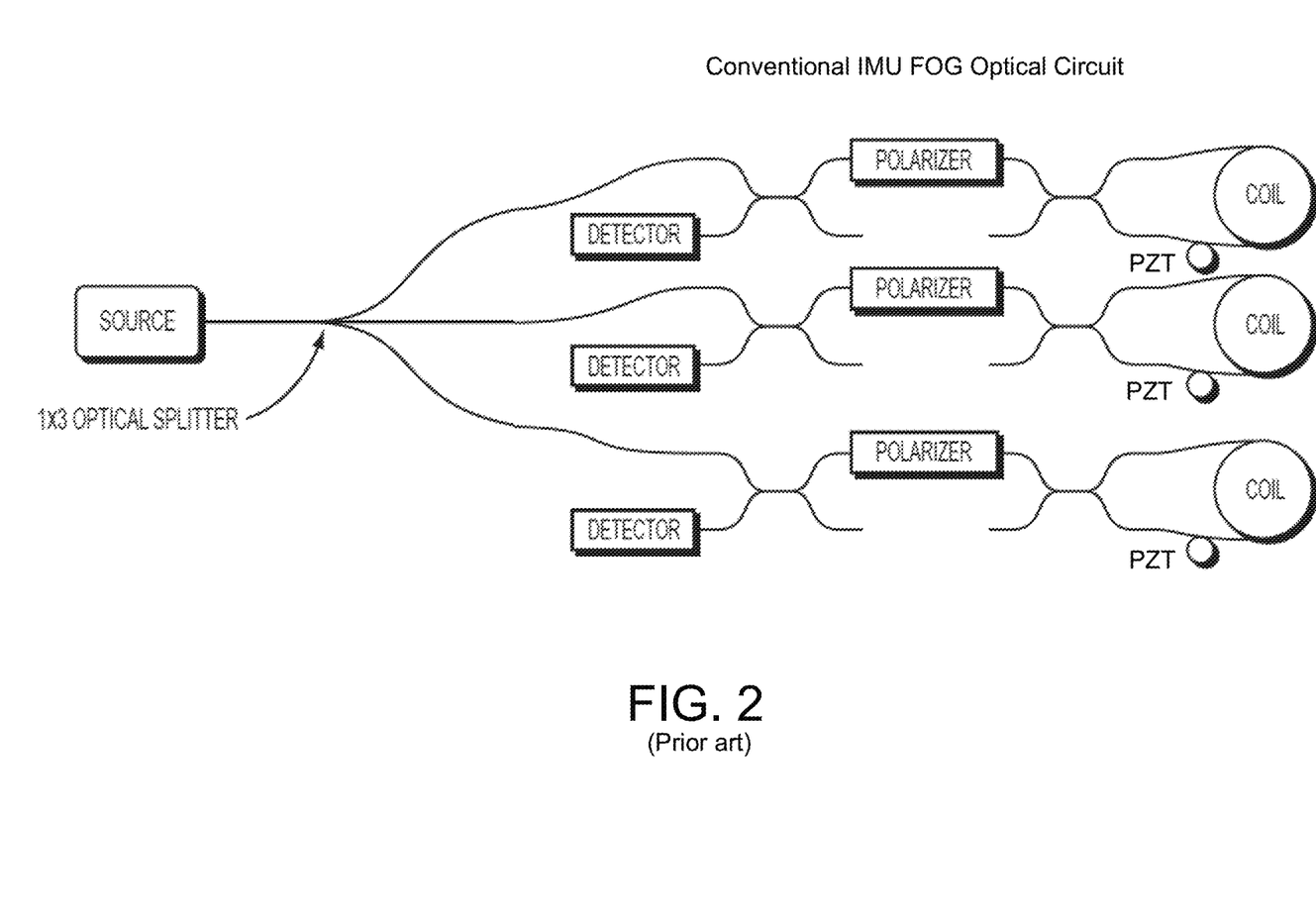
FIG. 2 illustrates an example three-axis IMU package.

A conventional IMU typically employs three individual optical circuits, one for each orthogonal axis (or more, e.g., for redundancy). FIG. 2 illustrates an example three-axis IMU package, which incorporates three of the individual single-axis 2×2 optical circuits shown in FIG. 1. In the example shown in FIG. 2, a single light source 202 is shown driving the three optic circuits through a 1×3 optical splitter, although the IMU package may be configured so that each optic circuit has a dedicated light source. The conventional IMU package depicted in FIG. 2 requires enough space to hold many tens of meters of fiber for each optical circuit while maintaining a minimum bend radius dictated by the fiber. Further, the individual components of the optical circuits need to be coupled together by, for example, splicing or other similarly laborious technique.

Figure 3:
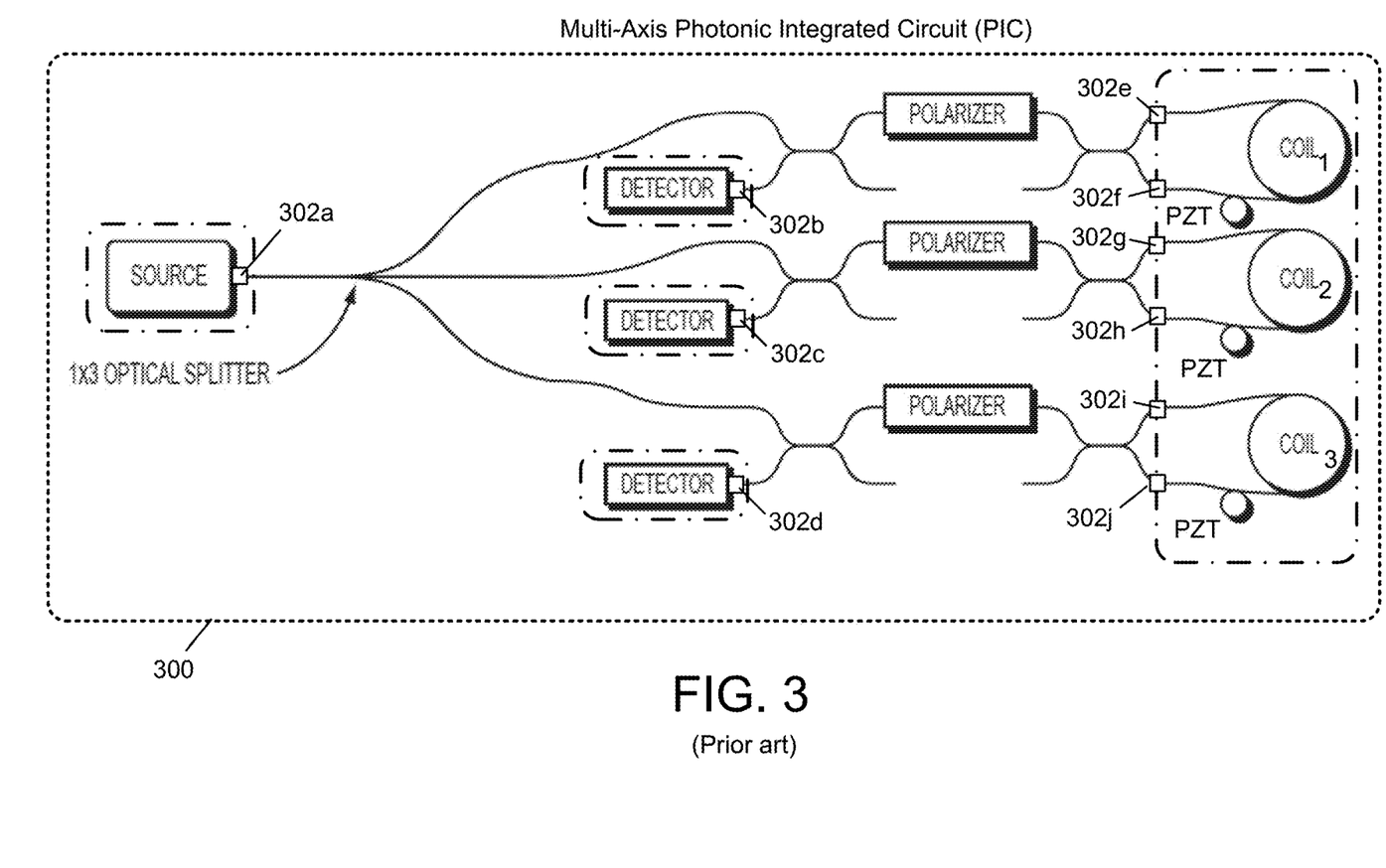
FIG. 3 shows the IMU package depicted in FIG. 2, but implemented using a photonic integrated circuit (PIC).

FIG. 3 shows the IMU package depicted in FIG. 2, but implemented using a photonic integrated circuit (PIC) 300. Components such as the splitters, couplers, polarizers, modulators, and connecting waveguides are implemented on the PIC. Thus, a photonic IMU PIC allows for the incorporation of multiple gyroscopic axes on one single planer circuit with a single fiber-to-chip interface that can be realized easily with a fiber array. The IMU components shown within a broken lined box (i.e., the source, the three detectors and the three fiber coils) are not implemented on the PIC, but are connected through an optical fiber array (not shown) to the PIC. The solid square boxes 302a-302j, shown on each of these external components, represents an interface to the fiber array. In a conventional IMU package, each of these fiber interfaces needs to be spliced or otherwise optically coupled to a fiber that connects the external component to the PIC. As with the configuration shown in FIG. 2, the splices may be laborious and time consuming. In prior art systems, the placement of the interfaces to the optical fiber array are typically dictated by the associated fiber optic circuit layout. Tedious packing and fiber placement is required to ensure that the optical fibers are not damaged and adhere to environmental requirements affecting optical figures of merit such as optical loss and polarization extinction ratio (PER). Moving the placement of the interfaces may alter the layout of the fiber optic circuit, which, consequentially, may adversely affect the performance of the fiber optic circuit.

SUMMARY

The embodiments of the invention described herein are directed to a photonic integrated circuit (PIC) architecture suitable for hosting a multi-axis fiber optic gyroscope (FOG) system. The example embodiments of a PIC-based multi-axis FOG are shown being used in an Inertial Measurement Unit (IMU) system, although the described embodiments may be used in other applications. Further, the embodiments described herein are not limited to FOG applications, but may be used for other interferometric optical circuits or other optical circuits suitable for implementation on a PIC.

The described embodiments are directed to a PIC layout that arranges optical interfaces to an optical fiber array in one or more local groups, such that the resulting PIC layout does not adversely affect the performance of the associated optical circuits. In one embodiment, all the optical interfaces are grouped together on one facet of the PIC for connection to a single optical fiber array. In other embodiments, the optical interfaces may be arranged in two or more groups on one facet of the PIC for connection to two or more optical fiber arrays. In other embodiments, the optical interfaces may be arranged in two or more groups on two or more facets of the PIC (e.g., sides, top, bottom of the PIC) for connection to two or more optical fiber arrays.

The example embodiments of a photonic IMU PIC with multi-axis layout with the interface to components external to the PIC located on one facet of the PIC facilitates high yield, high volume production with one single optical interface that enables the simultaneous optical coupling of multiple optical ports. A photonic IMU PIC according to the described embodiments may eliminate multiple individual optical splices by implementing one single interface. The single interface allows for high throughput, high yield manufacturing processes such as fiber pig-tailing and wafer scale manufacturing, inspection, and PIC production, that easily scale when compared to hand-splicing of optical fibers. The incorporation of a source optical splitter on the PIC facilitates the use of a single optical source to drive the multiple single-axis 2×2 optical FOG circuits required to implement the multi-axis IMU functionality. In other embodiments, individual optical sources may be used to drive each of the multiple single-axis 2×2 optical FOG circuits, without the use of a source optical splitter. The optical sources may be fiber pig-tailed or integrated into the silicon photonic FOG planar waveguide circuit.

An IMU PIC implemented according to the described embodiments requires only a few square millimeters to accomplish multiple axis FOG capability, which is an order of magnitude improvement in size as compared to the prior art. Further, the larger the required axis count, the more the size and cost scaling improves.

In one aspect, the invention may be a photonic integrated circuit (PIC), comprising at least two optical circuits disposed on the PIC, and two or more optical interfaces each configured to provide a connection to at least one external optical component. The PIC may further comprise a layout arrangement of the at least two optical circuits on the PIC. The layout arrangement may be configured such that the two or more optical interfaces are situated in at least one local group of optical interfaces, and the at least one local group of optical interfaces is located on at least one facet of the PIC.

The at least two optical circuits may comprise a set of N single-axis 2×2 optical fiber optic gyroscope (FOG) circuits, N being a positive integer greater than 1. The layout arrangement of the at least two optical circuits on the PIC may facilitate realization of at least one performance parameter associated with the at least two optical circuits. The at least one performance parameter may include, but are not limited to, optical loss and polarization extinction ratio (PER).

The PIC may further comprise at least one optical fiber array arranged to implement an optical connection to the two or more optical interfaces. A first end of the at least one optical fiber array may be fixedly attached to the at least one facet of the PIC two or more optical interfaces, thereby providing the optical connection to the two or more optical interfaces. A second end of the at least one optical fiber array may be optically coupled to the at least one optical component. The at least one optical fiber array is a single optical fiber array fixedly attached to a single facet of the PIC. The at least one fiber array is two or more optical fiber arrays fixedly attached to a single facet of the PIC. The at least one fiber array is two or more optical fiber arrays fixedly attached to two or more facets of the PIC.

The at least one facet of the PIC may be one or more of a side of the PIC, a top of the PIC, and/or a bottom of the PIC. The at least one external component is one or more of an optical source, an optical detector, and/or a fiber optic coil.

In another aspect, the invention may be a method of fabricating a photonic integrated circuit (PIC), comprising disposing at least two optical circuits on the PIC, each of the at least two optical circuits characterized by a layout arrangement. The method may further comprise disposing two or more optical interfaces on the PIC, each of the two or more optical interfaces configured to provide a connection to at least one external optical component. The method may further comprise configuring the layout arrangement such that the two or more optical interfaces are situated in at least one local group of optical interfaces, and the at least one local group of optical interfaces is located on at least one facet of the PIC.

The method may further comprise providing a set of N single-axis 2×2 optical fiber optic gyroscope (FOG) circuits to implement the at least two optical circuits, N being a positive integer greater than 1.

The method may further comprise facilitating realization of at least one performance parameter associated with the at least two optical circuits, using the layout arrangement of the at least two optical circuits on the PIC.

The method may further comprise arranging at least one fiber array to implement an optical connection to the two or more optical interfaces.

The method may further comprise (i) fixedly attaching a first end of the at least one optical fiber array to the at least one facet of the PIC two or more optical interfaces, thereby providing the optical connection to the two or more optical interfaces, and (ii) optically coupling a second end of the at least one optical fiber array to the at least one optical component.

The method may further comprise fixedly attaching the single optical fiber array to a single facet of the PIC, to implement the at least one optical fiber array.

The method may further comprise fixedly attaching two or more optical fiber arrays to a single facet of the PIC, in order to implement the at least one fiber array.

The method may further comprise fixedly attaching two or more optical fiber arrays to two or more facets of the PIC, in order to implement the at least one fiber array.

The method may further comprise implementing the at least one facet of the PIC as one or more of a side of the PIC, a top of the PIC, and/or a bottom of the PIC.

The method may further comprise implementing the at least one external component as one or more of an optical source, an optical detector, and/or a fiber optic coil.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

DETAILED DESCRIPTION

A description of example embodiments follows.

The teachings of all patents, published applications and references cited herein are incorporated by reference in their entirety.

Figure 4:
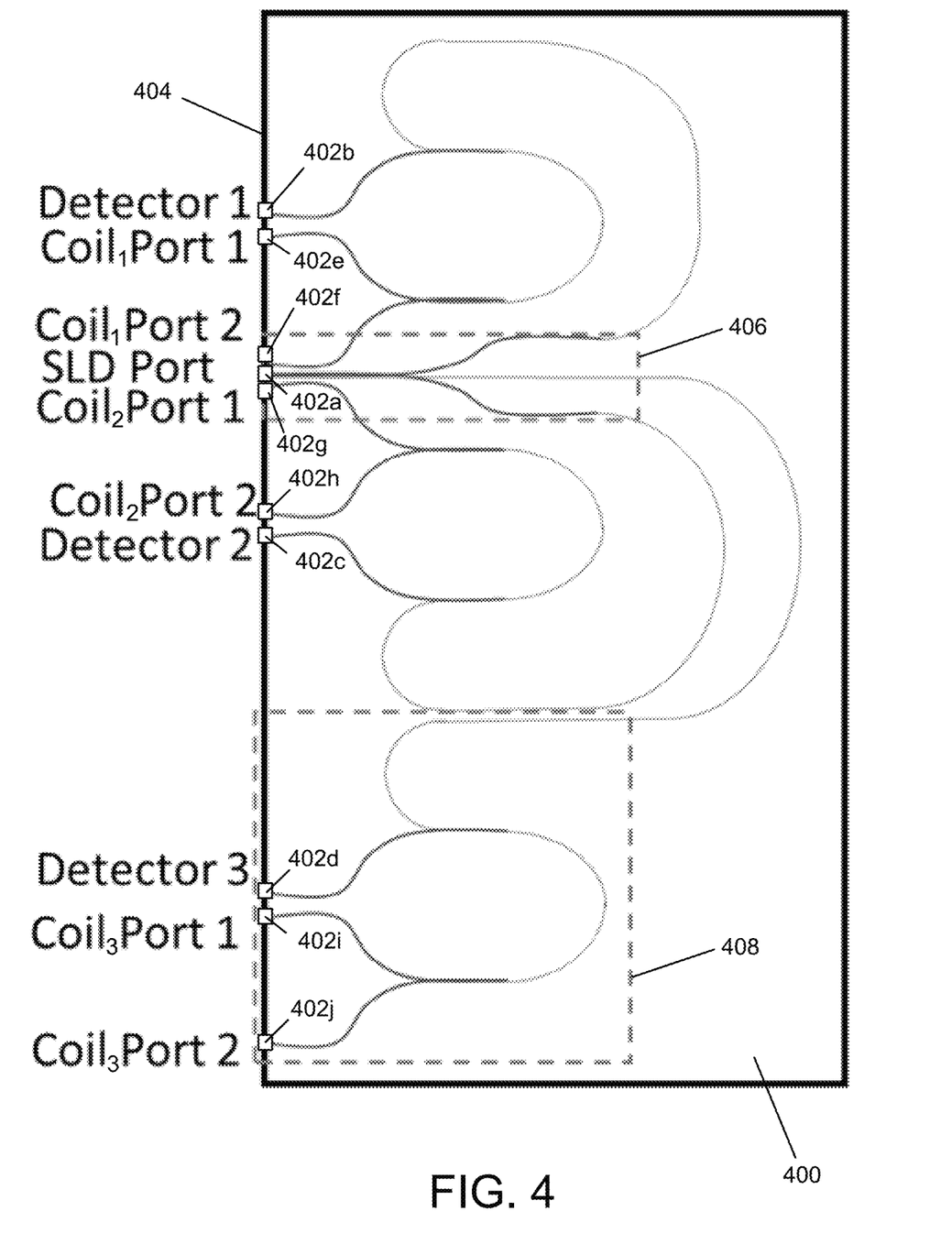
FIG. 4 illustrates an example embodiment of a PIC layout that implements a three axis FOG optical circuit according to the invention.

FIG. 4 illustrates an example embodiment of a PIC layout that implements the three axis FOG optical circuit shown in FIG. 3, according to the invention. The example embodiment of FIG. 4 comprises an optical source splitter (shown in box 406), and three independent FOG optical circuits (one of which is shown in box 408). This example embodiment implements all of the components shown in FIG. 3 except for the external components (i.e., the source, the three detectors, and the three fiber optic coils).

Optical interfaces 402*a* through 402*j*, which are grouped on a single facet 404 of the PIC 400 (e.g., the left side of the PIC as shown in FIG. 4), correspond to the optical interfaces 302*a* through 302*j* shown in FIG. 3. Optical interface 402*a* corresponds to the optical interface to the SLD, optical interfaces 402*b*, 402*c*, 402*d* correspond to the optical interfaces to detector 1, detector 2, and detector 3, respectively. Optical interfaces 402*e*, 402*f* correspond to the optical interfaces to the first fiber optic coil, optical interfaces 402*g*, 402*h* correspond to the optical interfaces to the second fiber optic coil, and optical interfaces 402*i*, 402*j* correspond to the optical interfaces to the third fiber optic coil.

The specific layout shown in FIG. 4 is one example of a layout that (i) groups the optical interfaces to external components on a single facet 404 of the PIC 400 and (ii) maintains acceptable performance parameters of the optical circuits hosted by the PIC 400. It should be understood that FIG. 4 depicts just one non-limiting example of such a layout, and that embodiments of the invention may include other layouts that satisfies the grouping and performance criteria set forth above.

Figure 5A:
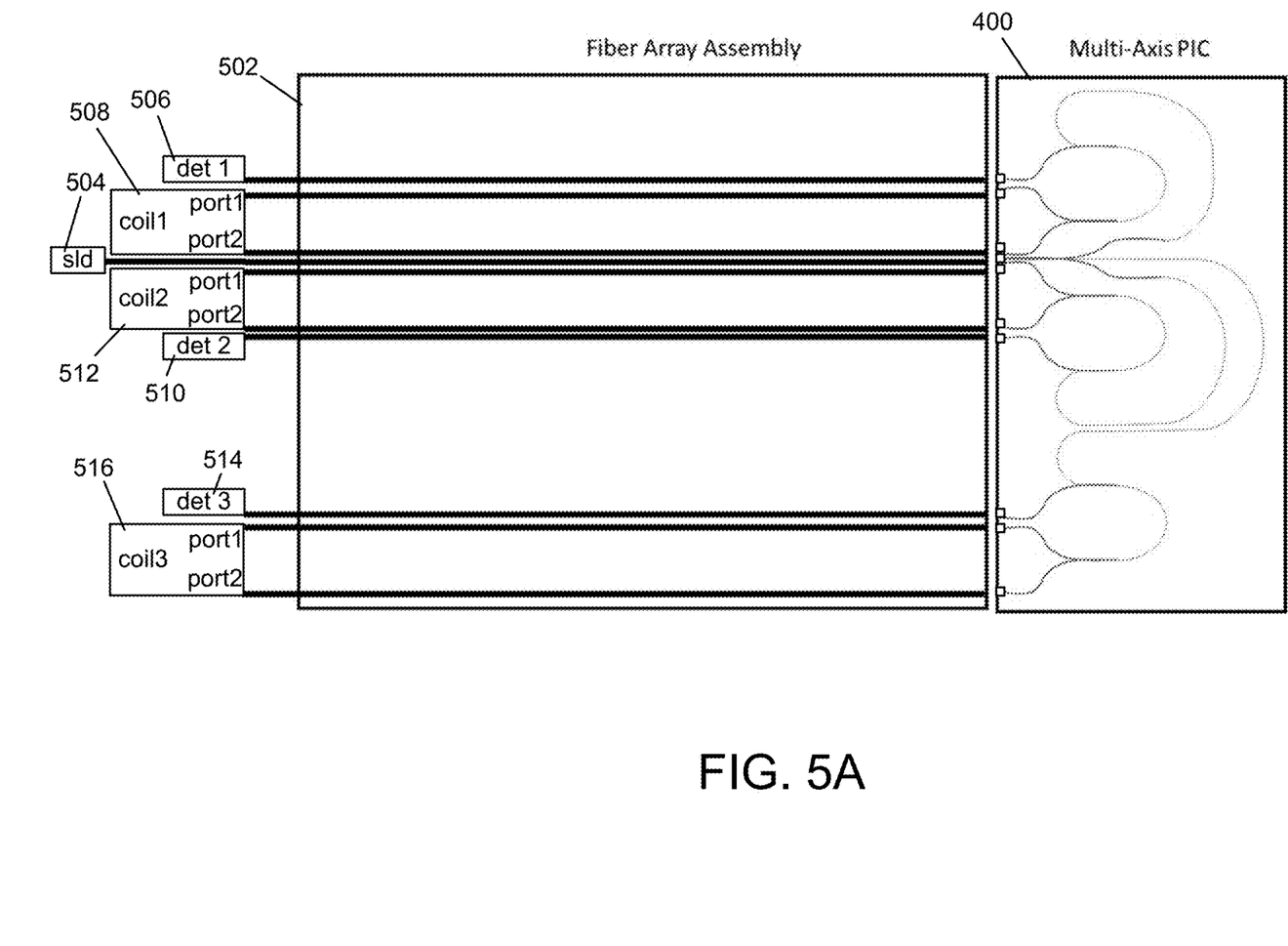
FIG. 5A illustrates a PIC aligned with an example embodiment of a fiber optic array, according to the invention.

FIG. 5A illustrates the PIC shown in FIG. 4, aligned with an example embodiment of a fiber optic array 502, which is coupled to SLD 504, Detector1 506, Coil1 508, Detector2 510, Coil2 512, Detector3 514, and Coil3 516. FIG. 5 demonstrates that all axes of the FOG PIC 400 may be connected to necessary external components, through the fiber optic array 502, in one manufacturing process step. The one manufacturing process step may comprise alignment of the fiber optic array 502 with the PIC 400, and bonding (e.g., using an adhesive known in the art) the fiber optic array 502 to the PIC 400.

Figure 5B:
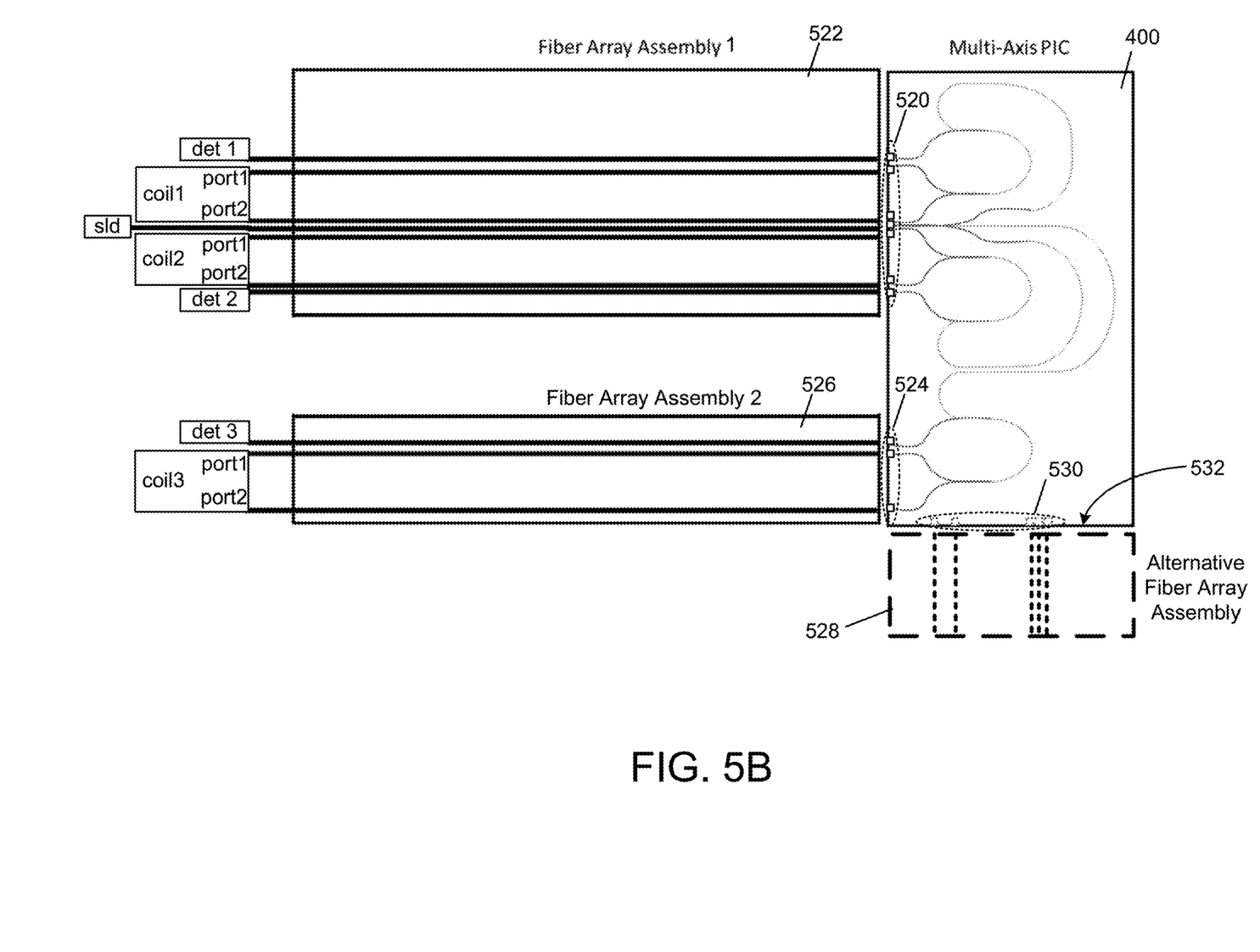
FIG. 5B illustrates a PIC aligned with more than one fiber optic array.

The example embodiment of FIG. 5B demonstrates that the invention is not limited to a single fiber array assembly and a single grouping of optical interfaces. In the example embodiment of FIG. 5B, a first grouping 520 of PIC optical interfaces is configured to connect to a first fiber array assembly 522, and a second grouping 524 of PIC optical interfaces is configured to connect to a first fiber array assembly 526.

In another embodiment, an alternative fiber array 528 may be arranged to connect to the PIC 400 on one or more different facets of the PIC. In the example of FIG. 5B, an alternative fiber array assembly 528 connects to PIC optical interfaces 530 (shown as dashed line boxes) that are arranged on the lower PIC facet 532. In such an alternative embodiment, the optical interfaces of the one or both of groups 520 or 524 may be redistributed to the other facet, or the other facet 532 may host optical interfaces for other optical circuits of the PIC 400. Similarly, in other embodiments, the optical interfaces may be arranged on other facets of the PIC 400, e.g., any side, and/or top surface, and/or bottom surface of the PIC 400, and/or combinations thereof.

Figure 6:
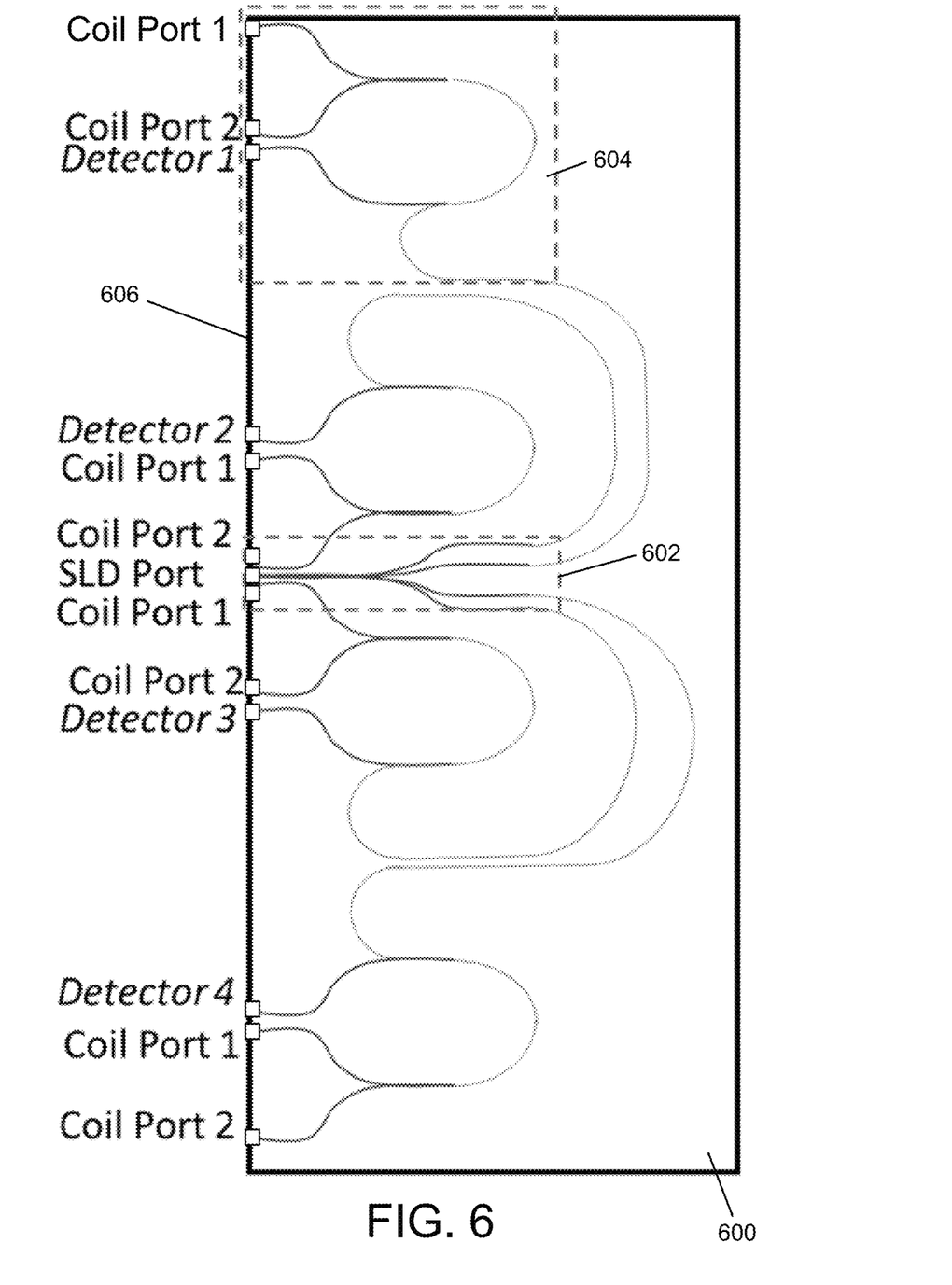
FIG. 6 illustrates an alternative embodiment of a PIC architecture according to the invention.

FIG. 6 illustrates an alternative embodiment of a PIC 600 architecture according to the invention, comprising a 1×4 optical splitter 602 and four independent FOG optical circuits, all with optical interfaces located on a single facet 606 of the host PIC 600. This PIC architecture is similar to the architecture shown in FIG. 4, but with an extra optical circuit 604. This topography of four FOG optical circuits integrated into one PIC is an example of a contingent N-1 design, in which a failure of any one axis can be replaced with the extra FOG optical circuit to mitigate any potential degradation of system performance. This type of contingent scaling is problematic with conventional FOG circuits because multiple FOG axes must be incorporated, which requires substantial space requirements and complex assembly and integration processes. But such contingent scaling for redundant IMU and INS systems can easily be realized with a single Multi-axis PIC laid out in the configuration of the described embodiments.

Figure 7:
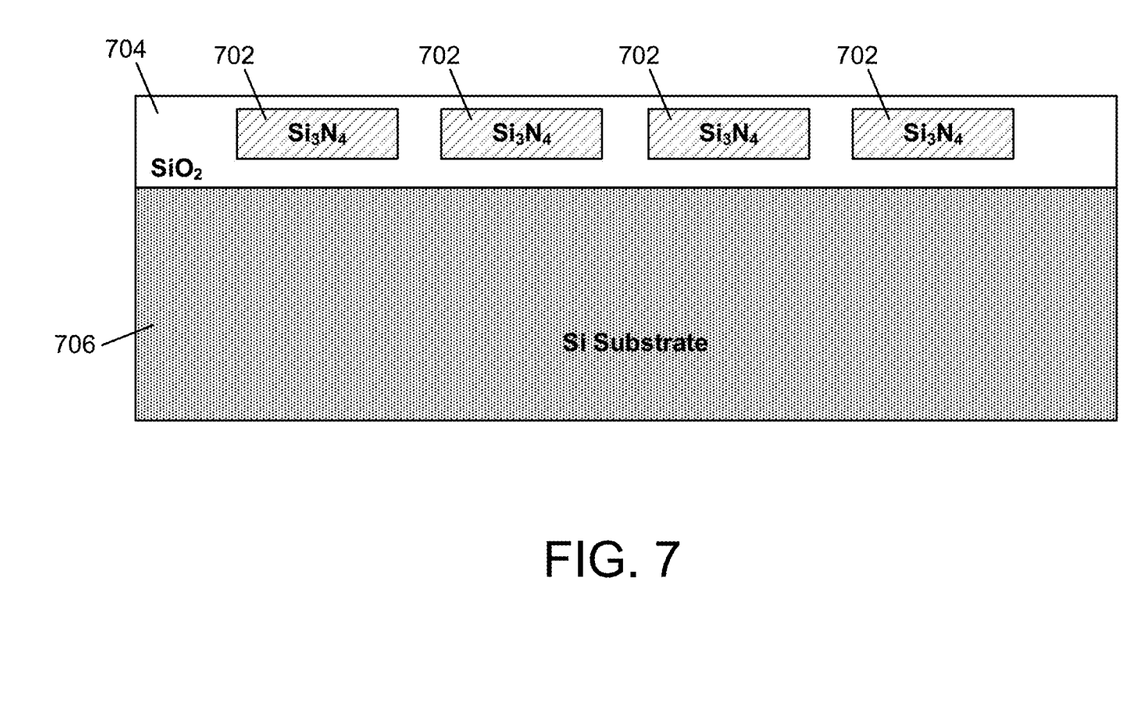
FIG. 7 shows an example cross-section of a multi-axis PIC construction according to embodiments of the invention.

FIG. 7 shows an example cross-section of a multi-axis PIC construction according to embodiments of the invention. The multi-axis PIC can be fabricated utilizing various waveguiding technologies including Si-nitride-based waveguides, Si/Si-oxide based waveguides, Indium Phosphate (InP) based waveguides, and other semiconductor or silica-based material waveguide structures. The waveguide itself may be fabricated in a rib waveguide, ridge waveguide, double strip or multi waveguide structures designed to confine and guide light at a specified wavelength. In this simplified example embodiment, a $Si_3N_4$ based waveguide 702, buried in a $SiO_2$ layer 704 on a silicon substrate 706, is utilized for the optical circuits in silicon.

While example embodiments have been particularly shown and described, it will be understood by those skilled in the art that various changes in form and details may be made therein without departing from the scope of the embodiments encompassed by the appended claims.

What is claimed is:

1. A photonic integrated circuit (PIC), comprising:
   at least two optical circuits disposed on the PIC;
   two or more optical interfaces, each of the two or more optical interfaces configured to provide a connection between a respective one of the at least two optical circuits and at least one external optical component;
   a layout arrangement of the at least two optical circuits on the PIC, the layout arrangement configured such that all of the two or more optical interfaces of the at least two optical circuits disposed on the PIC are situated in at least one local group of optical interfaces, and the at least one local group of optical interfaces is located on a single facet of the PIC.

2. The PIC of claim 1, wherein the at least two optical circuits comprises a set of N single-axis 2×2 optical fiber optic gyroscope (FOG) circuits, N being a positive integer greater than 1.

3. The PIC of claim 1, wherein the layout arrangement of the at least two optical circuits on the PIC facilitates realization of at least one performance parameter associated with the at least two optical circuits.

4. The PIC of claim 1, further comprising at least one optical fiber array arranged to implement an optical connection to the two or more optical interfaces.

5. The PIC of claim 4, wherein:
   a first end of the at least one optical fiber array is fixedly attached to the at least one facet of the PIC two or more optical interfaces, thereby providing the optical connection to the two or more optical interfaces; and
   a second end of the at least one optical fiber array is optically coupled to the at least one optical component.

6. The PIC of claim 4, wherein the at least one optical fiber array is a single optical fiber array fixedly attached to a single facet of the PIC.

7. The PIC of claim 4, wherein the at least one fiber array is two or more optical fiber arrays fixedly attached to a single facet of the PIC.

8. The PIC of claim 4, wherein the at least one fiber array is two or more optical fiber arrays fixedly attached to two or more facets of the PIC.

9. The PIC of claim 1, wherein the at least one facet of the PIC is one or more of a side of the PIC, a top of the PIC, and/or a bottom of the PIC.

10. The PIC of claim 1, wherein the at least one external component is one or more of an optical source, an optical detector, and/or a fiber optic coil.

11. A method of fabricating a photonic integrated circuit (PIC), comprising:
 disposing at least two optical circuits on the PIC, each of the at least two optical circuits characterized by a layout arrangement;
 disposing two or more optical interfaces on the PIC, each of the two or more optical interfaces configured to provide a connection between a respective one of the at least two optical circuits and at least one external optical component;
 configuring the layout arrangement such that all of the two or more optical interfaces of the at least two optical circuits on the PIC are situated in at least one local group of optical interfaces, and the at least one local group of optical interfaces is located on a single facet of the PIC.

12. The method of claim 11, further comprising providing a set of N single-axis 2×2 optical fiber optic gyroscope (FOG) circuits to implement the at least two optical circuits, N being a positive integer greater than 1.

13. The method of claim 11, further comprising facilitating realization of at least one performance parameter associated with the at least two optical circuits, using the layout arrangement of the at least two optical circuits on the PIC.

14. The method of claim 11, further comprising arranging at least one fiber array to implement an optical connection to the two or more optical interfaces.

15. The method of claim 14, further comprising (i) fixedly attaching a first end of the at least one optical fiber array to the at least one facet of the PIC two or more optical interfaces, thereby providing the optical connection to the two or more optical interfaces, and (ii) optically coupling a second end of the at least one optical fiber array to the at least one optical component.

16. The method of claim 14, further comprising fixedly attaching the single optical fiber array to a single facet of the PIC, to implement the at least one optical fiber array.

17. The method of claim 14, further comprising fixedly attaching two or more optical fiber arrays to a single facet of the PIC to implement the at least one fiber array.

18. The method of claim 14, further comprising fixedly attaching two or more optical fiber arrays to two or more facets of the PIC to implement the at least one fiber array.

19. The method of claim 11, further comprising implementing the at least one facet of the PIC as one or more of a side of the PIC, a top of the PIC, and/or a bottom of the PIC.

20. The method of claim 11, further comprising implementing the at least one external component as one or more of an optical source, an optical detector, and/or a fiber optic coil.

* * * * *